(12) United States Patent
Sakota et al.

(10) Patent No.: US 11,084,664 B2
(45) Date of Patent: Aug. 10, 2021

(54) PART ALIGNMENT AND TRANSPORT DEVICE

(71) Applicant: Seki Kogyo Co., Ltd., Hatsukaichi (JP)

(72) Inventors: Kouji Sakota, Hatsukaichi (JP);
Yoshiharu Horiuchi, Hatsukaichi (JP);
Seiji Miura, Hatsukaichi (JP)

(73) Assignee: Seki Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 17/064,291

(22) Filed: Oct. 6, 2020

(65) Prior Publication Data
US 2021/0016403 A1 Jan. 21, 2021

Related U.S. Application Data

(63) Continuation of application No. PCT/JP2019/015174, filed on Apr. 5, 2019.

(30) Foreign Application Priority Data

Apr. 11, 2018 (JP) .............................. JP2018-076024

(51) Int. Cl.
*B65G 47/24* (2006.01)
*B65G 47/14* (2006.01)
(52) U.S. Cl.
CPC .................................. *B65G 47/14* (2013.01)
(58) Field of Classification Search
CPC ...... B65G 47/14; B65G 47/24; B65G 47/248; B65G 47/256
USPC .................... 198/389, 448; 221/95, 133, 158
See application file for complete search history.

(56) References Cited

U.S. PATENT DOCUMENTS

| | | | | |
|---|---|---|---|---|
| 3,221,857 A | * | 12/1965 | Keller | B67B 3/0645 193/46 |
| 3,823,803 A | * | 7/1974 | Lubin | B65G 11/203 193/46 |
| 3,908,859 A | * | 9/1975 | Hohmann | G07F 11/40 221/118 |
| 4,033,441 A | * | 7/1977 | Pataki | B65G 47/681 193/38 |
| 4,265,356 A | * | 5/1981 | Glover | B65G 47/681 198/444 |
| 5,394,973 A | * | 3/1995 | Emmart | H05K 13/022 193/46 |
| 6,254,332 B1 | * | 7/2001 | Miura | B23K 11/0053 198/459.7 |
| 7,559,435 B2 | * | 7/2009 | Miura | B23K 11/0053 198/468.4 |

(Continued)

FOREIGN PATENT DOCUMENTS

| | | |
|---|---|---|
| EP | 0684194 A1 | 11/1995 |
| JP | S55-002878 U | 1/1980 |
| JP | H02-193812 A | 7/1990 |

(Continued)

*Primary Examiner* — Douglas A Hess
(74) *Attorney, Agent, or Firm* — Renner, Otto, Boisselle & Sklar, LLP (57) ABSTRACT

Parts merge smoothly without any stopper at a branching region. A determining and sorting unit determines, between an introduction passage and a branching region, whether weld nuts at rest are facing up or down. The weld nuts determined as facing up are fed to a first branch passage, whereas the weld nuts determined as facing down are fed to a second branch passage.

5 Claims, 8 Drawing Sheets

(56) References Cited

U.S. PATENT DOCUMENTS

7,896,194 B2 * 3/2011 Sakota .................. B23P 19/007
                                                          221/213
10,377,570 B2 * 8/2019 Dirkmann .............. B65G 47/66

FOREIGN PATENT DOCUMENTS

| JP | H06-016225 A | 1/1994 |
| JP | H07-315554 A | 12/1995 |
| JP | 2013-154972 A | 8/2013 |

* cited by examiner

PART ALIGNMENT AND TRANSPORT DEVICE

CROSS-REFERENCE TO RELATED APPLICATIONS

This is a continuation of International Application No. PCT/JP2019/015174 filed on Apr. 5, 2019, which claims priority to Japanese Patent Application No. 2018-076024 filed on Apr. 11, 2018. The entire disclosures of these applications are incorporated by reference herein.

BACKGROUND

The present invention relates to a part orienting system that orients parts such as nuts. As a typical orienting system of this type, for example, Japanese Unexamined Patent Publication No. H7-315554 discloses a part orienting system including: an introduction passage, two branch passages branching off from the introduction passage into two, a discharge passage at which the branch passages merge. In this orienting system, parts facing up pass through one of the branch passages, whereas parts facing down pass through the other. Both the parts face in the same direction at the discharge passage. Each branch passage has a stopper at its downstream portion to reduce collision of the parts at a merge point of discharge passage.

SUMMARY

In Japanese Unexamined Patent Publication No. H7-315554, however, the system requires stopper pins, that is, a larger number of parts. Thus, it disadvantageously takes time and effort to maintain the system.

The present invention has been made in view of the problem. It is an objective of the present invention to smoothly merge parts with no stopper pin at a branch point.

A first aspect of the invention is directed to a part orienting system for feeding, in a same direction, front surfaces of a plurality of parts that are fed. The system includes: an introduction passage through which the parts pass; a branching region located downstream of the introduction passage, the branching region including a first branch passage through which parts facing up pass, and a second branch passage through which parts facing down pass, and orienting, into the same direction, the front surfaces of the parts that have passed through the first and second branch passages; a merge point located downstream of the branching region, the merge point allowing the first branch passage and the second branch passage to merge; and a determining and sorting unit between the introduction passage and the branching region, and configured to determine whether the parts at rest are facing up or down and feed parts determined as facing up to the first branch passage and parts determined as facing down to the second branch passage.

In a second aspect of the invention that is an embodiment of the first aspect, the parts are nuts each having a front surface portion that is flat, and a back surface including a back surface portion that is flat and a projection on an outer peripheral edge of the back surface portion. The determining and sorting unit includes a holder configured to hold each of the parts with the front surface and the back surface facing in a direction orthogonal to a path of the parts, the holder including an abutting surface configured to abut on the front surface or the back surface of each of the parts. The determining and sorting unit detects a first distance from the abutting surface to the front surface portion if the back surface of each of the parts abuts on the abutting surface, and a second distance from the abutting surface to the back surface portion if the front surface of each of the parts abuts on the abutting surface, and sorts and feeds, to the first branch passage, parts whose first distance has been detected and to the second branch passage, parts whose second distance has been detected.

In a third aspect of the invention that is an embodiment of the first or second aspect, the front surface and the back surface of each of the parts are, in the branching region, oriented into the direction orthogonal to the path of the parts. In the branching region, the first branch passage is twisted such that a downstream end is rotationally displaced at 180° with respect to an upstream end in a cross-sectional view orthogonal to the path of the parts so that the front surfaces of the parts that have passed through the branching region are oriented in the same direction at the merge point.

In a fourth aspect of the invention that is an embodiment of the first or second aspect, the front surface and the back surface of each of the parts are, in the branching region, oriented into the direction orthogonal to the path of the parts. In the branching region, the first branch passage is twisted such that a downstream end is rotationally displaced at a first predetermined angle with respect to an upstream end in a cross-sectional view orthogonal to the path of the parts, and the second branch passage is twisted such that a downstream end is rotationally displaced at a second predetermined angle, in a direction opposite to rotational displacement of the downstream end of the first branch passage, with respect to the upstream end in the cross-sectional view orthogonal to the path of the parts. A sum of the first predetermined angle and the second predetermined angle is 180° so that the front surfaces of the parts that have passed through the branching region are oriented into the same direction at the merge point.

In a fifth aspect of the invention that is an embodiment of the fourth aspect, the first predetermined angle is 90° and the second predetermined angle is 90°.

According to the first aspect of the invention, whether the parts at rest are facing up or down is determined. The parts determined as facing up are sequentially fed to the first branching region, whereas the parts determined as facing down are sequentially fed to the second branching region. Accordingly, the parts can be intermittently fed to the first or second branching region. This configuration reduces the collision between the parts at the merge point and thus allows smooth feeding of the parts with no stopper pin in the branching regions.

According to the second aspect of the invention, when the back surfaces of the parts abut on the abutting surface of the holder, the tops of the projections of the parts abut on the abutting surface. Accordingly, the first distance from the abutting surface to the front surface portion of each part corresponds to the thickness including the projection of the part. On the other hand, when the front surfaces of the parts abut on the abutting surface of the holder, the flat front surface portions of the parts abut on the abutting surface. Accordingly, the second distance from the abutting surface to the back surface portion of each part corresponds to the thickness excluding the projection of the part. Therefore, whether the parts are facing up or down can be determined by detecting the first and second distances with the parts being at rest. As a result, the parts facing up can be intermittently fed to the first branch passage, whereas the parts facing down can be intermittently fed to the second branch passage.

According to the third aspect of the invention, the front surfaces of the parts passing through the upstream end of the first branch passage are rotationally displaced at 180° at the downstream end. Accordingly, the front surfaces of the parts passing through the downstream end of the first branch passage and the front surfaces of the parts passing through the downstream end of the second branch passage are oriented in the same direction. As a result, the parts merge at the merge point with the front surfaces of the parts oriented in the same direction.

According to the fourth aspect of the invention, the front surfaces of the parts passing through the upstream end of the first branch passage are rotationally displaced at the first predetermined angle at the downstream end. On the other hand, the front surfaces of the parts passing through the upstream end of the second branch passage are rotationally displaced at the second predetermined angle, in the direction opposite to the rotational displacement of the parts that have passed through the first branch passage, at the downstream end. Since the sum of the first and second angles is 180°, the front surfaces of the parts passing through the downstream end of the first branch passage and the front surfaces of the parts passing through the downstream end of the second branch passage are oriented in the same direction. As a result, the parts merge at the merge point with the front surfaces of the parts oriented in the same direction.

According to the fifth aspect of the invention, the front surfaces of the parts passing through the upstream end of the first branch passage are rotationally displaced at 90° at the downstream end. On the other hand, the front surfaces of the parts passing through the upstream end of the second branch passage are rotationally displaced at 90°, in the direction opposite to the rotational displacement of the parts that have passed through the first branch passage, at the downstream end. Accordingly, the front surfaces of the parts passing through the downstream end of the first branch passage and the front surfaces of the parts passing through the downstream end of the second branch passage are oriented in the same direction. This configuration reduces the difference between the time required for a part to pass through the first branch passage and the time required for a part to pass through the second branch passage. This configuration reduces the collision between the parts, which have been fed intermittently to the branch passages, at the merge point.

DETAILED DESCRIPTION

Now, an embodiment of the present invention will be described in detail with reference to the drawings. The following description of an advantageous embodiment is mere examples in nature, and is not at all intended to limit the scope, applications or use of the present invention.

Embodiment

—Orienting System—

A configuration of an orienting system will be described. In the following description, the terms "up," "down," "left," "right," "front," and "back" correspond to the directions described in FIGS. 1 and 2 unless otherwise specified.

Figure 1:
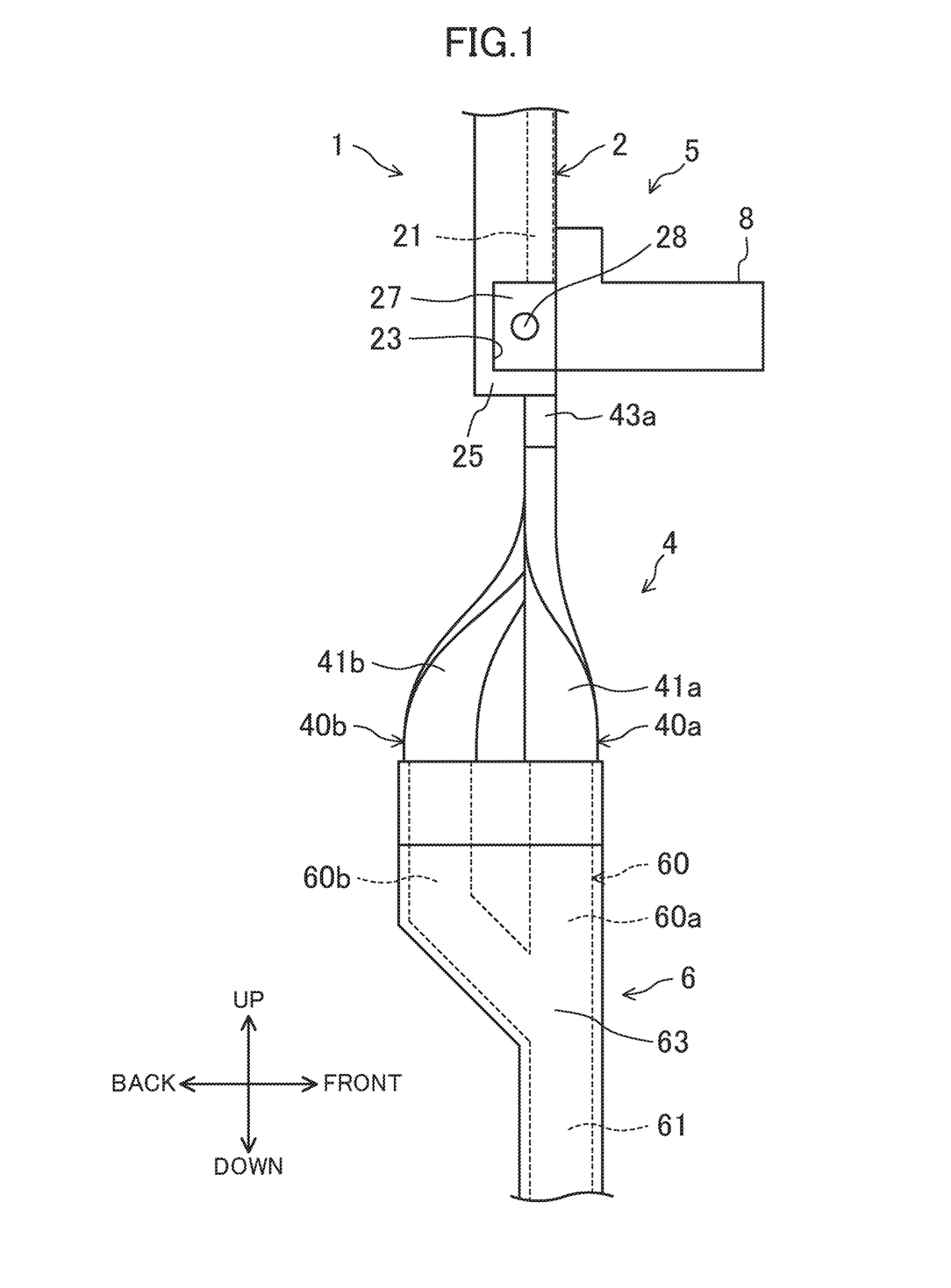
FIG. 1 is a front view showing an overall configuration of an orienting system according to an embodiment of the present invention.
Figure 2:
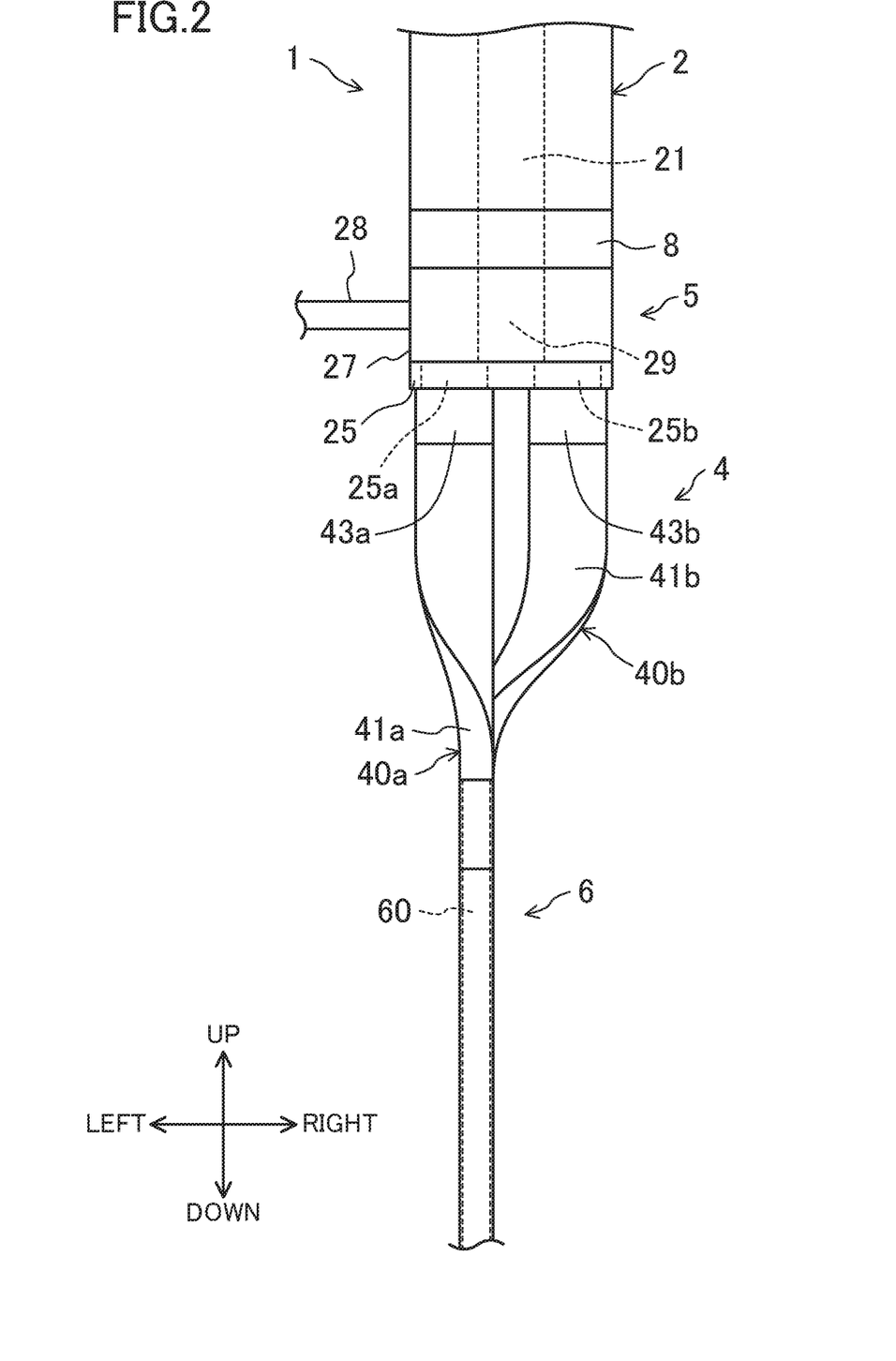
FIG. 2 is a side view showing the overall configuration of the orienting system.

FIGS. 1 and 2 show an overall configuration of an orienting system 1. This orienting system 1 is placed, for example, in a component feeder (not shown) such as a nut feeder. The orienting system 1 has, on its upstream side (i.e., the upper side), an input chute (not shown) into which parts are input. On the other hand, the orienting system 1 has, on its downstream side (i.e., the lower side), a supply head (not shown) for supplying parts to a workpiece. The orienting system 1 orients the parts sent from the input chute so that their surfaces face in a predetermined direction, and feeds the parts in this state to the supply head.

Figure 3:
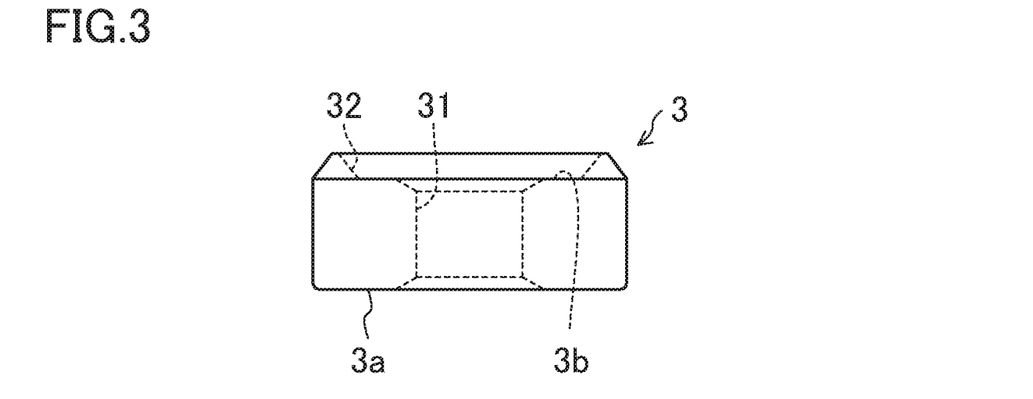
FIG. 3 is a front view showing a configuration of a weld nut.

Examples of parts oriented and fed in this embodiment include weld nuts 3. As shown in FIG. 3, each of these weld nuts 3 is in the shape of a disk having a screw hole 31 at its center. The weld nut 3 has a flat front surface portion 3a. On the other hand, the weld nut 3 has a back surface including a flat back surface portion 3b and a projection 32 on the entire outer peripheral edge of the back surface portion 3b. In the following description, the state in which the front surface portion 3a faces forward is referred to as "facing up", whereas the state in which the back surface portion 3b faces forward is referred to as "facing down", as an example.

The orienting system 1 includes an introduction member 2, a branching region 4, and a determining and sorting unit 5.

<Introduction Member>

Figure 4:
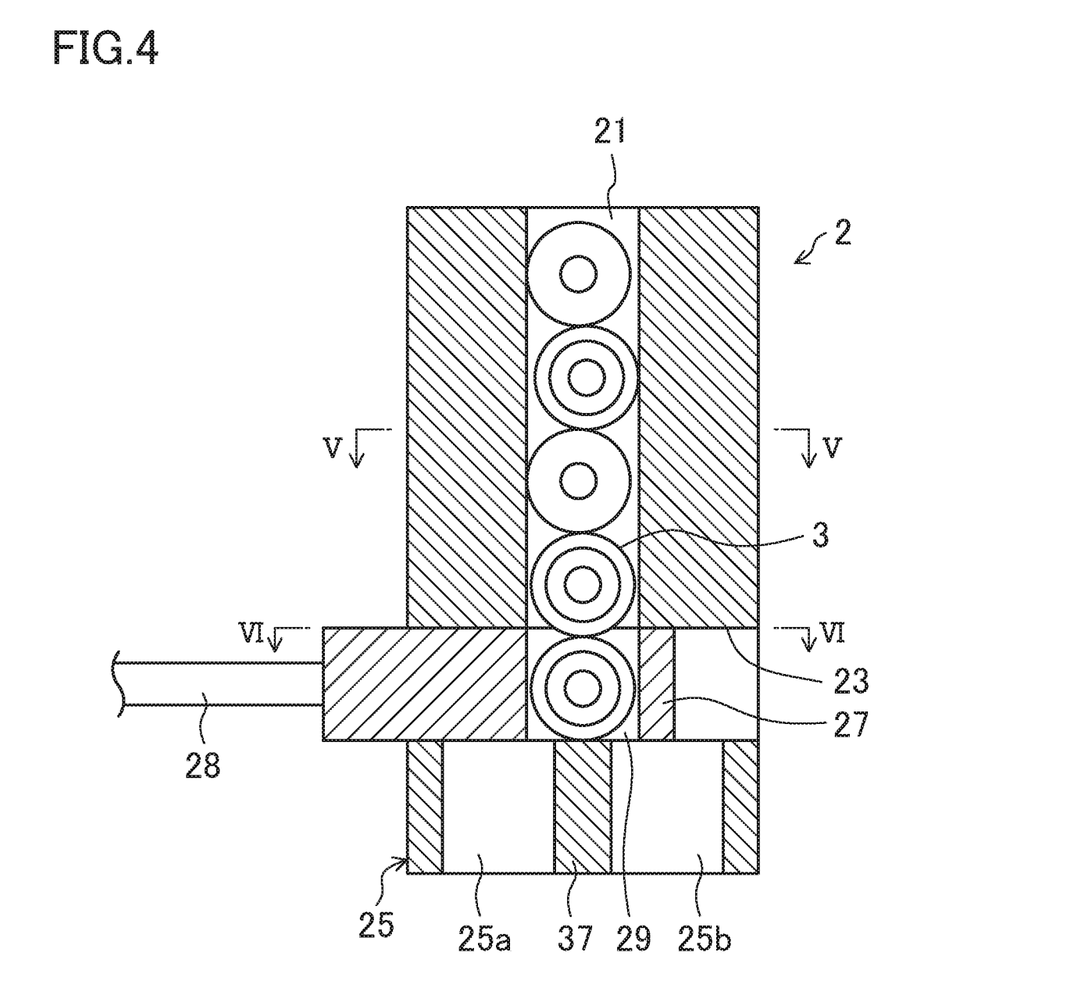
FIG. 4 is a longitudinal sectional view showing a configuration of an introduction member.

As shown in FIG. 4, the introduction member 2 is in the shape of a substantially rectangular parallelepiped whose longitudinal direction agrees with the up-and-down direction. The upstream end of the introduction member 2 is connected to the input chute into which the weld nuts 3 are input. That is, the introduction member 2 is configured such that the weld nuts 3 input into the input chute pass through the inside of the introduction member 2 due to free fall and are fed downstream. The introduction member 2 includes an introduction passage 21, a cutout 23, and an outlet 25.

Figure 5:
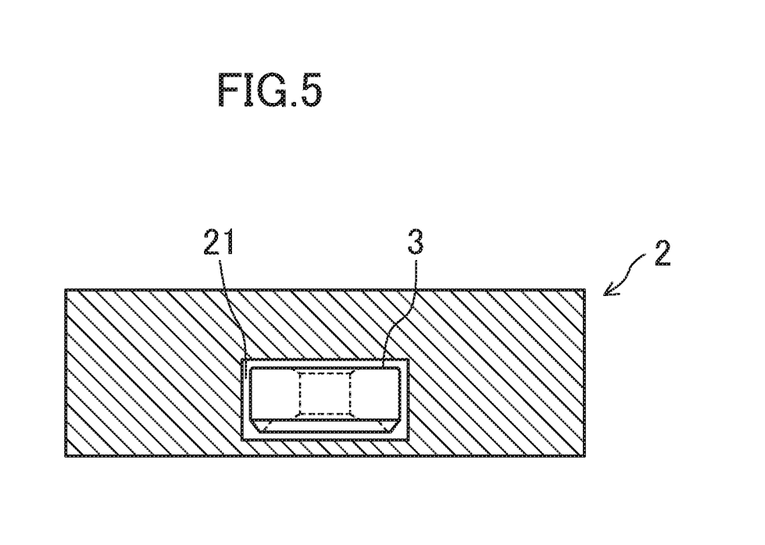
FIG. 5 is a cross-sectional view taken along line V-V in FIG. 4.
Figure 6:
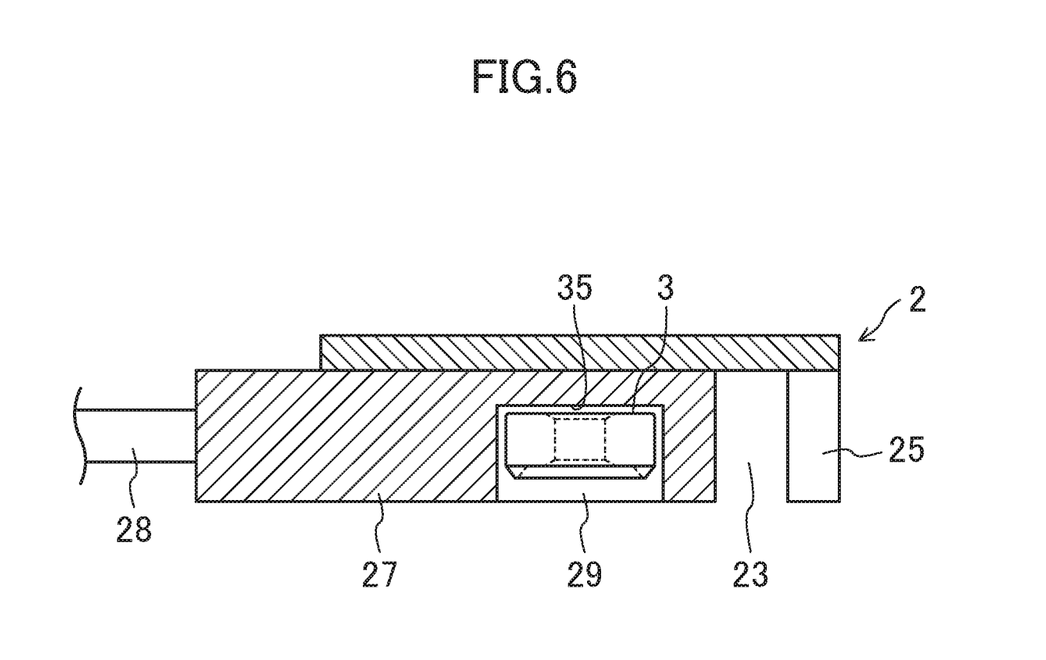
FIG. 6 is a cross-sectional view taken along line VI-VI in FIG. 4.

The introduction passage 21 allows the weld nuts 3 to pass. As shown in FIG. 5, the introduction passage 21 extends from the upper end to the lower end in a position closer to the front of the introduction member 2.

The introduction passage 21 has a rectangular transverse section. The introduction passage 21 has a transverse-sectional shape with long sides slightly longer than the outer diameter of each weld nut 3 and short sides slightly longer than the thickness of the weld nut 3. In the transverse section of the introduction passage 21, the long sides extend in the left-and-right direction and the short sides in the front-andback direction. In this manner, the introduction passage 21 is formed such that the front surface portion 3a and the back surface portion 3b of each weld nut 3 face the front-and-back direction, that is, the direction orthogonal to the path of the weld nuts 3.

The cutout 23 is adjacent to and under the introduction passage 21. The cutout 23 is recessed backward from the front surface of the introduction member 2 and extends throughout the entire length of the introduction passage 21 in the left-and-right direction. The length of the cutout 23 in the up-and-down direction is slightly longer than the outer diameter of each weld nut 3.

Fitted into the cutout 23 is a sorting member 27 that is a part of the determining and sorting unit 5. The configuration of the sorting member will be described later.

The outlet 25 is in contact with the lower end of the cutout 23. The outlet 25 includes a first outlet 25a and a second outlet 25b. The first and second outlets 25a and 25b are adjacent to each other in the left-and-right direction. Specifically, the first outlet 25a is located on the left of the second outlet 25b. Interposed between the first and second outlets 25a and 25b is a partition 37. Each of the outlets 25a and 25b has, in the left-and-right and front-and-back directions, substantially the same lengths as the introduction passage 21. Although not shown, in order to facilitate the downward feeding of the weld nuts 3, each of the outlets 25a and 25b may have, on its inner wall, an air nozzle for injecting compressed air downward.

<Branching Region>

The branching region 4 is located downstream of the introduction passage 21. The branching region 4 includes a first twist chute 41a and a first discharge passage 60a, which together constitute a first branch passage 40a, and a second twist chute 41b and a second discharge passage 60b, which together constitute a second branch passage 40b.

The first twist chute 41a is connected to the first outlet 25a by a first connecting pipe 43a so as to communicate with the first outlet. Specifically, the upper end of the first connecting pipe 43a is inserted into the first outlet 25a, whereas the lower end region is inserted into the first twist chute 41a.

The first twist chute 41a is a flexible tube with a rectangular cross section. The first twist chute 41a has a cross-sectional shape with long sides slightly longer than the outer diameter of each weld nut 3 and short sides slightly longer than the thickness of the weld nut 3. As shown in FIGS. 1 and 2, the first twist chute 41a has an upper end whose long sides extend in the left-and-right direction and whose short sides extend in the front-and-back direction. The first twist chute 41a is twisted as follows and fixed to a discharge member 6. As seen from above, that is, in the cross-sectional view orthogonal to the path of the weld nuts 3, the lower end is rotationally displaced counterclockwise at 90° with respect to the upper end. That is, the first twist chute 41a has a lower end whose long sides extend in the front-and-back direction and whose short sides extend in the left-and-right direction.

The second twist chute 41b is connected to the second outlet 25b by a second connecting pipe 43b so as to communicate with the second outlet 25b. Specifically, the upper end of the second connecting pipe 43b is inserted into the second outlet 25b, whereas the lower end is inserted into the second twist chute 41b.

The second twist chute 41b is a flexible tube with a rectangular cross section. The second twist chute 41b has a cross-sectional shape with long sides slightly longer than the outer diameter of each weld nut 3 and short sides slightly longer than the thickness of the weld nut 3.

As shown in FIGS. 1 and 2, the second twist chute 41b has an upper end whose long sides extend in the left-and-right direction and whose short sides extend in the front-and-back direction. The second twist chute 41b is twisted as follows and fixed to the discharge member 6. As seen from above, that is, in the cross-sectional view orthogonal to the path of the weld nuts 3, the lower end is rotationally displaced clockwise at 90° with respect to the upper end. In other words, the second twist chute 41b is twisted to be rotationally displaced at 90° in the direction opposite to the rotational displacement of the first twist chute 41a. That is, the second twist chute 41b has a lower end whose long sides extend in the front-and-back direction and whose short sides extend in the left-and-right direction.

The first and second discharge passages 60a and 60b are included in the discharge member 6.

The discharge member 6 is located downstream of the branching region 4 and feeds the weld nuts 3 to the supply head. The discharge member 6 has, in its inside, a discharge passage 60 formed into a substantial Y-shape. The discharge passage 60 includes the first discharge passage 60a, the second discharge passage 60b, a merge passage 61, and a merge point 63. The discharge passage 60 has a rectangular cross section with long sides slightly longer than the outer diameter of each weld nut 3 and short sides slightly longer than the thickness of the weld nut 3. The discharge passage 60 has the cross section whose long sides extend in the front-and-back direction and whose short sides extend in the left-and-right direction.

The first and second discharge passages 60a and 60b are in parallel to each other from the upper end to an intermediate portion of the discharge member 6 in the up-and-down direction. The first and second discharge passages 60a and 60b are arranged in the front-and-back direction. The first discharge passage 60a is located in front of the second discharge passage 60b.

The lower end of the first twist chute 41a is inserted into the upper end of the first discharge passage 60a. The first discharge passage 60a constitutes, together with the first twist chute 41a, the first branch passage 40a. The first discharge passage 60a is not twisted and allows the weld nuts 3 sent from the first twist chute 41a to pass without changing the orientations of the weld nuts 3.

On the other hand, the lower end of the second twist chute 41b is inserted into the upper end of the second discharge passage 60b. The second discharge passage 60b constitutes, together with the second twist chute 41b, the second branch passage 40b. The second discharge passage 60b is not twisted and allows the weld nuts 3 sent from the second twist chute 41b to pass without changing the orientations of the weld nuts.

The first and second discharge passages 60a and 60b merge at a merge point 63 located in the intermediate portion of the discharge member 6 in the up-and-down direction. That is, the first and second branch passages 40a and 40b merge at the merge point 63. The merge passage 61 extends downstream of the merge point 63 of the discharge passage 60.

<Determining and Sorting Unit>

Figure 7:
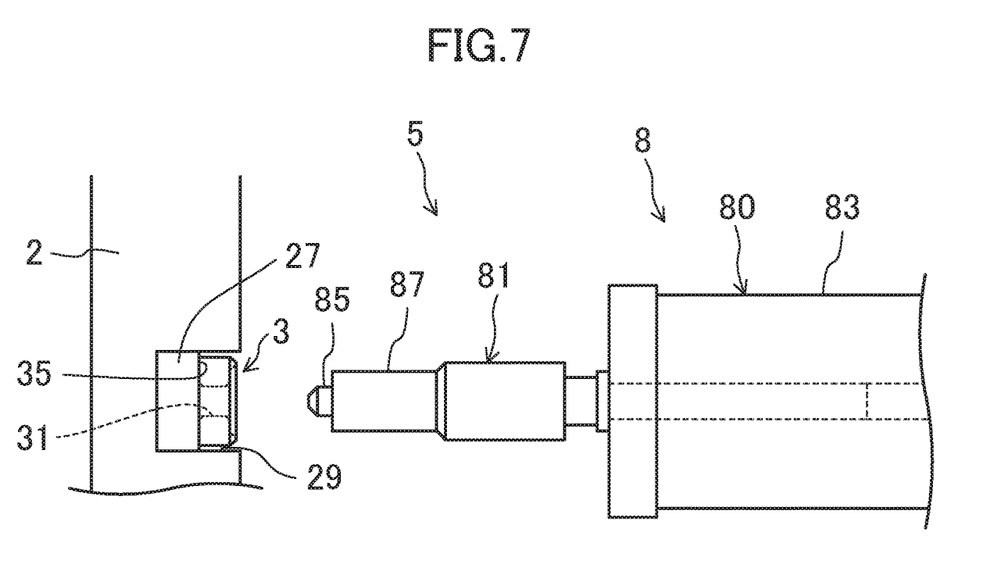
FIG. 7 is a schematic view showing a configuration of a determining and sorting unit.

The determining and sorting unit 5 determines whether the weld nuts 3 at rest are facing up or down. The determining and sorting unit 5 feeds the weld nuts 3 facing up to the first twist chute 41a and the weld nuts 3 facing down to the second twist chute 41b. As shown in FIG. 7, the determining and sorting unit includes the sorting member 27 and a determining member 8.

The sorting member 27 is located in the cutout 23. The sorting member 27 has the substantially same outer size as the cutout 23. The sorting member 27 has a groove 29 recessed backward from the front surface. The sorting member 27 is coupled to an actuator 28 and is slidable in the left-and-right direction.

As shown in FIG. 4, the groove 29 communicates with the introduction passage 21 with their positions in the left-and-right direction agreeing with each other. Each weld nut 3 that has passed through the introduction passage 21 is housed in the groove 29. The groove 29 holds the weld nut 3 with the front surface portion 3a and the back surface portion 3b facing the front-and-back direction. That is, the groove 29 functions as a holder that holds the weld nut 3. In addition, the groove 29 has a bottom surface 35 serving as an abutting surface that abuts on the front surface portion 3a or the projection 32 of the weld nut 3.

The sorting member 27 sorts and feeds to the first outlet 25a, the weld nuts 3 determined as facing up by the determining member 8 and to the second outlet 25b, the weld nuts 3 determined as facing down. The sorting operation of the sorting member 27 will be described later.

The determining member 8 is located on the front surface of the introduction member 2. Specifically, the determining member 8 is in front of the cutout 23. The determining member 8 includes, for example, a determiner (not shown) and a cylinder 80 having, at its distal end, an extension 81 extending and contracting in the front-and-back direction. The determining member 8 determines whether each weld nut 3 at rest in the groove 29 of the sorting member 27 facing up or down. The determining member 8 detects first and second distances. The first distance extends from the bottom surface 35 to the front surface portion 3a where the projection 32 of the weld nut 3 abuts on the bottom surface 35. The second distance extends from the bottom surface 35 to the back surface portion 3b where the front surface 3a of the weld nut 3 abuts on the bottom surface 35. The determining member 8 determines whether the weld nut 3 is facing up or down based on the difference between the first and second distances.

As shown in FIG. 7, the cylinder 80 includes a main body 83 and the extension 81 that extends and contracts in the front-and-back direction with respect to the main body 83. The extension 81 includes an insertion portion 85 and a pressing portion 87. The insertion portion 85 constitutes the tip of the extension 81. The insertion portion 85 is formed into a cylindrical shape. The insertion portion 85 has an outer diameter that is smaller than the inner diameter of the screw hole 31 of each weld nut 3. The length of the insertion portion 85 is shorter than the thickness of the weld nut 3. The pressing portion 87 is adjacent to the insertion portion 85. The pressing portion 87 is formed into a cylindrical shape. The pressing portion 87 has an outer diameter longer than the inner diameter of the screw hole 31 of each weld nut 3 and shorter than the inner diameter of the projection 32.

Figure 8:
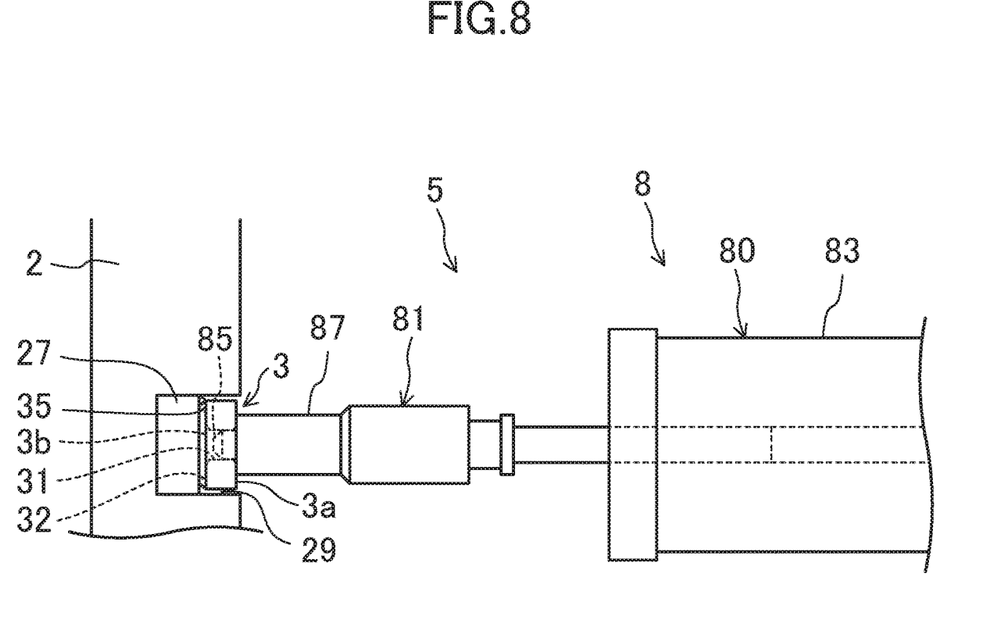
FIG. 8 corresponds to FIG. 7 when determining the orientation of a weld nut facing up.

FIG. 8 is a schematic view showing determination on whether a weld nut 3 facing up is facing up or down. When the weld nut 3 is housed in the groove 29, the extension 81 of the cylinder 80 extends backward. Once the extension 81 extends, the insertion portion 85 is inserted into the screw hole 31. In addition, the pressing portion 87 abuts on the front surface portion 3a of the weld nut 3 and presses the back surface of the weld nut 3 onto the bottom surface 35. At this time, the projection 32 on the back surface of the weld nut 3 abuts on the bottom surface 35. The first distance from the bottom surface 35 to the front surface portion 3a is thus equal to the thickness of the weld nut 3 including the height of the projection 32.

Figure 9:
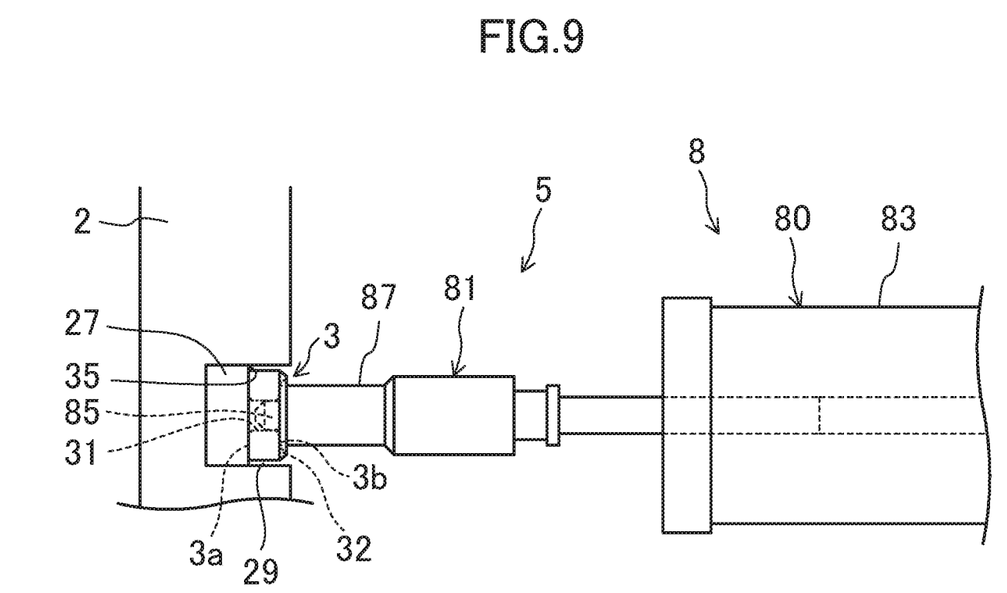
FIG. 9 corresponds to FIG. 7 when determining the orientation of a weld nut facing down.

On the other hand, FIG. 9 is a schematic view showing determination on whether a weld nut 3 facing down is facing up or down. Once the extension 81 extends, the insertion portion 85 is inserted into the screw hole 31. Further, the pressing portion 87 abuts on the back surface portion 3b of the weld nut 3 and presses the front surface portion 3a of the weld nut 3 onto the bottom surface 35. At this time, the flat front surface portion 3a of the weld nut 3 abuts on the bottom surface 35. The second distance from the bottom surface 35 to the back surface portion 3b is thus equal to the thickness of the weld nut 3 excluding the height of the projection 32.

In this manner, the first distance from the bottom surface 35 to the front surface portion 3a and the second distance from the bottom surface 35 to the back surface portion 3b vary depending on whether the weld nut 3 is facing up or down. Thus, the amount of extension and contraction of the extension 81 differs depending on the orientation of the weld nut 3. The determiner detects the amount of extension and contraction of the extension 81, for example, to determine whether the weld nut 3 is facing up or down.

—Orientation of Weld Nut—

Next, the movement of the weld nuts 3 in the orienting system 1 will be described.

First, as shown in FIG. 4, the welded nuts 3 sent from the input chute pass through the inside of the introduction passage 21 due to free fall without being determined whether the weld nuts 3 are facing up or down. That is, the weld nuts 3 facing up and the weld nuts 3 facing down are mixed in the introduction passage 21.

Each weld nut 3 that has passed through the introduction passage 21 is held in the groove 29 of the sorting member 27. At this time, the partition 37 is located under the groove 29. The weld nut 3 freely falling is thus supported and stopped by the partition 37.

While the weld nut 3 is housed in the groove 29, the cylinder 80 operates to determine whether the weld nut 3 is facing up or down in the manner described above.

Figure 10:
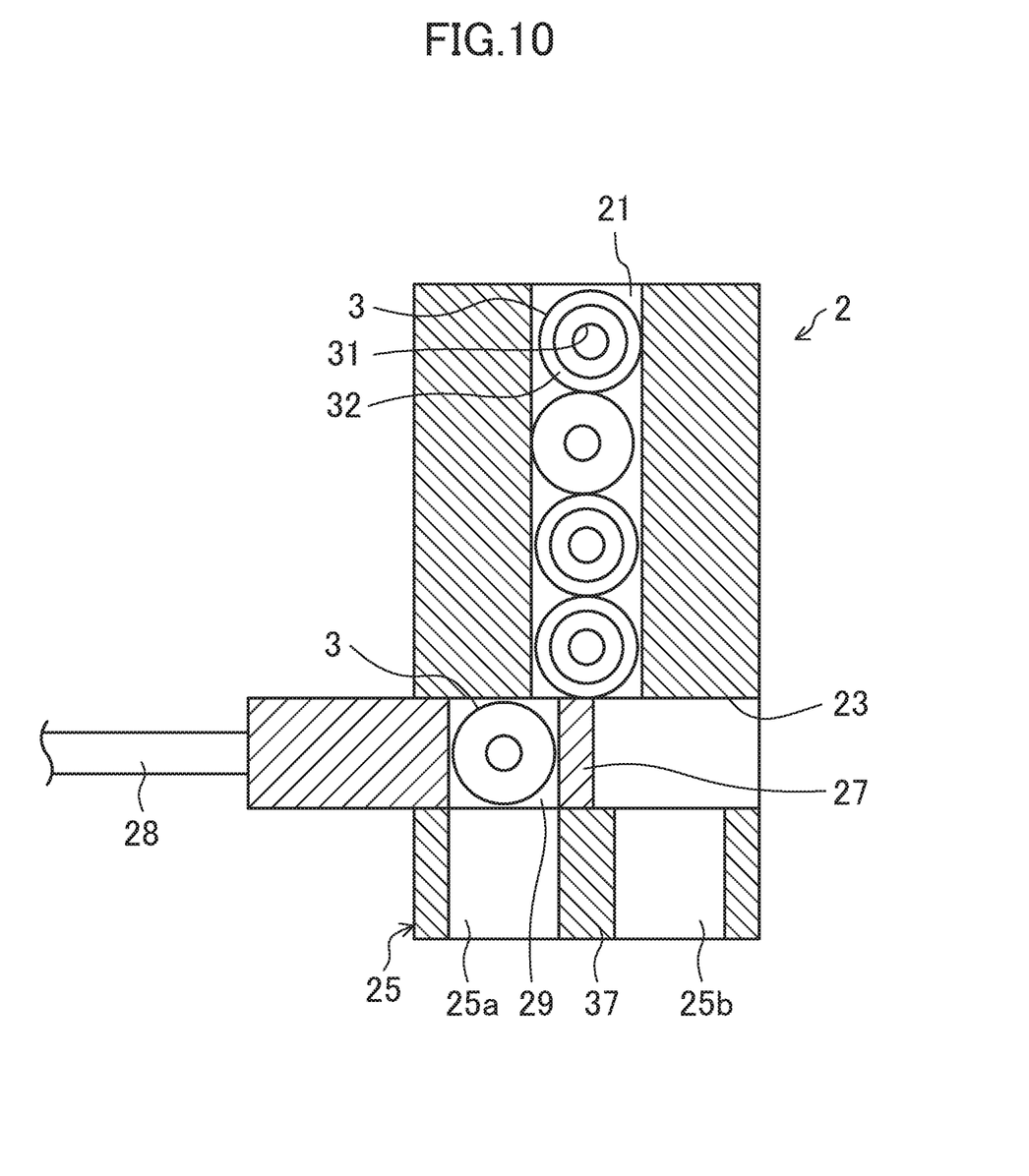
FIG. 10 corresponds to FIG. 4 when sorting a weld nut facing up.

If the weld nut 3 is facing up, as shown in FIG. 10, the actuator 28 slides the sorting member 27 to the left so that the positions of the groove 29 and the first outlet 25a in the left-and-right direction agree with each other. The weld nut 3 is then fed to the first outlet 25a and passes through the first branch passage 40a due to free fall. The first twist chute 41a is twisted such that the lower end is rotationally displaced counterclockwise at 90° with respect to the upper end as seen from above. When the weld nut 3 facing up passes through the first twist chute 41a, the front surface portion 3a is directed to the right, whereas the back surface portion 3b is directed to the left in the first discharge passage 60a. The weld nut 3 is fed to the merge point 63 with the front surface portion 3a facing the right and the back surface portion 3b facing the left.

Figure 11:
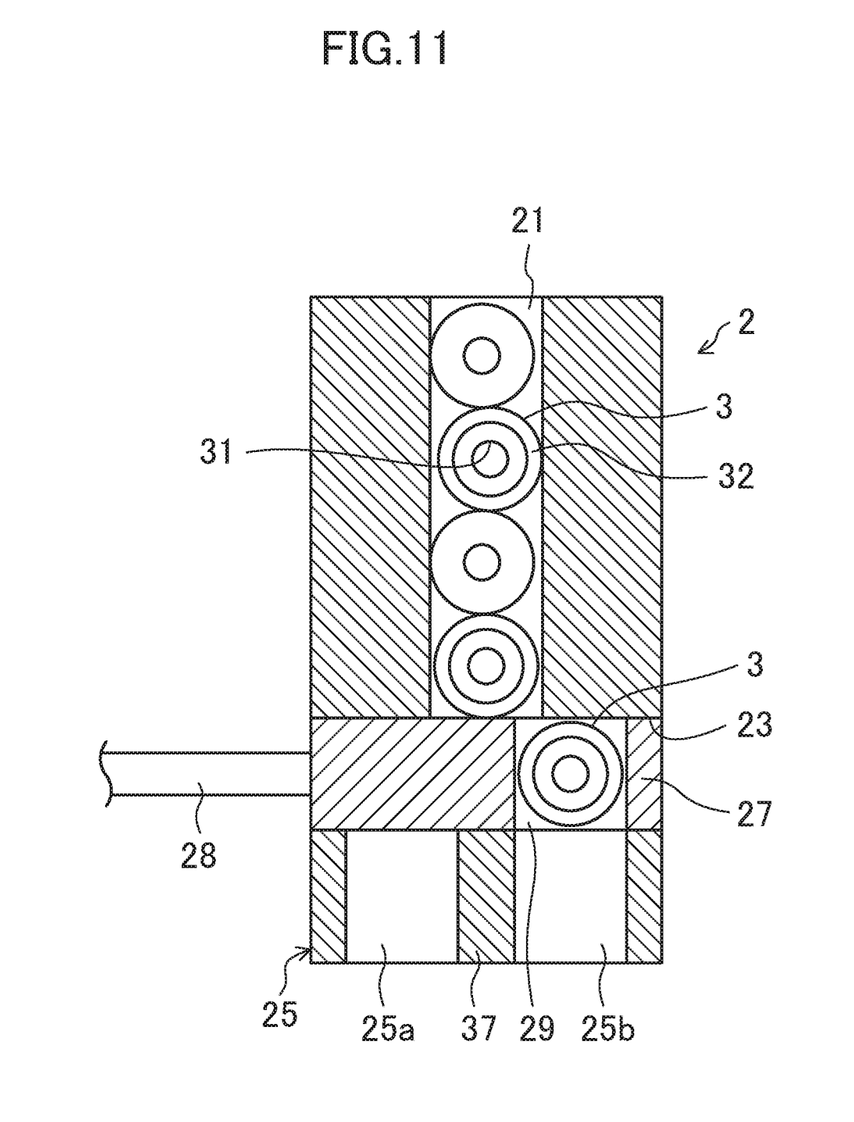
FIG. 11 corresponds to FIG. 4 when sorting a weld nut facing down.

On the other hand, if the weld nut 3 is facing down, as shown in FIG. 11, the actuator 28 slides the sorting member 27 to the right so that the positions of the groove 29 and the second outlet 25b in the left-and-right direction agree with each other. The weld nut 3 is then fed to the second outlet 25b and passes through the second branch passage 40b due to free fall. The second twist chute 41b is twisted such that the lower end is rotationally displaced clockwise at 90° with respect to the upper end as seen from above. When the weld nut 3 facing down passes through the second twist chute 41b, the front surface portion 3a is directed to the right, whereas the back surface portion 3b is directed to the left in the second discharge passage 60b. The weld nut 3 is fed to the merge point 63 with the front surface portion 3a facing the right and the back surface portion 3b facing the left.

In this manner, the weld nuts 3 are oriented in the same direction after passing through the branching region 4. The weld nuts 3 oriented and fed to the merge passage 61 are fed to the supply head (not shown).

Advantages of Embodiment

According to this embodiment, whether the weld nuts 3 as parts at rest are facing up or down is determined. The weld nuts 3 determined as facing up are sequentially fed to the first branch passage 40a, whereas the weld nuts 3 determined as facing down are sequentially fed to the second branch passage 40b. Accordingly, the weld nuts 3 can be intermittently fed to the first or second branch passage 40a or 40b. This configuration reduces the collision between the weld nuts 3 at the merge point 63 and thus allows smooth feeding of the parts with no stopper pin in the branching region 4. The determining and sorting unit 5 determines, in the groove 29 between the introduction passage 21 and the branching region 4, whether each weld nuts 3 is facing up or down. There is thus no need to move the weld nuts 3 extra in order to determine whether the weld nuts 3 are facing up or down.

When the back surface of the weld nut 3 abuts on the bottom surface 35, the bottom surface 35 abuts on the tip of the projection 32. Accordingly, the first distance from the bottom surface 35 to the front surface portion 3a corresponds to the thickness of the weld nut 3 including the height of the projection 32. On the other hand, when the front surface portion 3a of the weld nut 3 abuts on the bottom surface 35, the second distance from the bottom surface 35 to the back surface portion 3b corresponds to the thickness of the weld nut 3 excluding the height of the projection 32. Therefore, whether the weld nuts 3 at rest are facing up or down can be determined by detecting the first and second distances.

The first twist chute 41a of the first branch passage 40a is twisted such that the downstream end is rotationally displaced at 90° with respect to the upstream end in the cross-sectional view orthogonal to the path of the weld nuts 3. On the other hand, the second twist chute 41b of the second branch passage 40b is twisted such that the downstream end is rotationally displaced at 90°, in the direction opposite to the rotational displacement of the first twist chute 41a, with respect to the upstream end in the cross-sectional view orthogonal to the path of the weld nuts 3. That is, the first and second twist chutes 41a and 41b are twisted at substantially the same degree of the rotational displacement. This configuration reduces the difference between the time required for a weld nut 3 to pass through the first branch passage 40a and the time required for a weld nut 3 to pass through the second branch passage 40b. This configuration reduces simultaneous feeding of a plurality of weld nuts 3, which are intermittently fed to the branching region 4, to the merge point 63 to cause the collision between the weld nuts 3. This configuration further reduces excessive twisting of only one of the twist chutes. Thus, the twist chutes have reduced lengths. Accordingly, the first and second twist chutes 41a and 41b can be placed even in small spaces.

Other Embodiments

In the embodiment described above, raised as example parts are the weld nuts 3 each having the flat front surface portion 3a, and the projection 32 on the entire peripheral edge of the back surface portion 3b. However, the configuration is not limited thereto. The projection may be intermittently formed on the peripheral edge of the back surface of each part or may be omitted.

In the embodiment described above, the determining member 8 includes the cylinder 80 and detects the first and second distances to determine whether each weld nut 3 is facing up or down. The first distance extends from the bottom surface 35 to the front surface portion 3a of the weld nut 3, whereas the second distance extends from the bottom surface 35 to the back surface portion 3b of the weld nut 3. However, the configuration is not limited thereto. Examples of the determining member may include various determining means such as an image sensor, an optical sensor, a sound wave sensor, and a proximity sensor.

In the embodiment described above, the first twist chute 41a is twisted such that the lower end is rotationally displaced counterclockwise at 90° with respect to the upper end as seen from above. The second twist chute 41b is twisted such that the lower end is rotationally displaced at 90°, in the direction opposite to the rotational displacement of the lower end of the first twist chute 41a as seen from above. However, the configuration is not limited thereto. For example, one of the twist chutes may not be twisted, whereas the other twist chute may be twisted such that the lower end is rotationally displaced at 180° with respect to the upper end as viewed from above. Alternatively, one of the twist chutes may be twisted such that the lower end is rotationally displaced at a first predetermined angle with respect to the upper end as seen from above. The other twist chute may be twisted such that the lower end is rotationally displaced at a second predetermined angle, in the direction opposite to the rotational displacement of the lower end of the one of the twist chutes, with respect to the upper end as viewed from above. The sum of the first and second angles may be 180°. That is, the angles at which the twist chutes are twisted are not limited.

In the embodiment described above, the first branch passage 40a includes the first twist chute 41a and the first discharge passage 60a, whereas the second branch passage 40b includes the second twist chute 41b and the second discharge passage 60b. However, the configuration is not limited thereto. For example, each branch passage may be composed of a single member.

The present invention is useful as a part orienting system that orients parts such as nuts.

What is claimed is:

1. A part orienting system for feeding, in a same direction, front surfaces of a plurality of parts that are fed, the system comprising:
   an introduction passage through which the parts pass;
   a branching region located downstream of the introduction passage, the branching region including a first branch passage through which parts facing up pass, and a second branch passage through which parts facing down pass, and orienting, into the same direction, the front surfaces of the parts that have passed through the first and second branch passages;
   a merge point located downstream of the branching region, the merge point allowing the first branch passage and the second branch passage to merge; and
   a determining and sorting unit between the introduction passage and the branching region, and configured to determine whether the parts at rest are facing up or down and to feed parts determined as facing up to the first branch passage and parts determined as facing down to the second branch passage;

wherein the parts are nuts each having a front surface with a front surface portion that is flat, and a back surface including a back surface portion that is flat, and the determining and sorting unit includes a holder configured to hold each of the parts with the front surface and the back surface facing in a direction orthogonal to a path of the parts, the holder including an abutting surface configured to abut on the front surface or the back surface of each of the parts, detects a first distance from the abutting surface to the front surface portion if the back surface of each of the parts abuts on the abutting surface, and a second distance from the abutting surface to the back surface portion if the front surface of each of the parts abuts on the abutting surface, and sorts and feeds, to the first branch passage, parts whose first distance has been detected and, to the second branch passage, parts whose second distance has been detected.

2. The part orienting system of claim 1, wherein the back surface portion includes a projection on an outer peripheral edge of the back surface portion.

3. The part orienting system of claim 1, wherein the front surface and the back surface of each of the parts are, in the branching region, oriented into the direction orthogonal to the path of the parts, and in the branching region, the first branch passage is twisted such that a downstream end is rotationally displaced at 180° with respect to an upstream end in a cross-sectional view orthogonal to the path of the parts so that the front surfaces of the parts that have passed through the branching region are oriented in the same direction at the merge point.

4. The part orienting system of claim 1, wherein the front surface and the back surface of each of the parts are, in the branching region, oriented into the direction orthogonal to the path of the parts, in the branching region, the first branch passage is twisted such that a downstream end is rotationally displaced at a first predetermined angle with respect to an upstream end in a cross-sectional view orthogonal to the path of the parts, and the second branch passage is twisted such that a downstream end is rotationally displaced at a second predetermined angle, in a direction opposite to rotational displacement of the downstream end of the first branch passage, with respect to the upstream end in the cross-sectional view orthogonal to the path of the parts, and a sum of the first predetermined angle and the second predetermined angle is 180° so that the front surfaces of the parts that have passed through the branching region are oriented into the same direction at the merge point.

5. The part orienting system of claim 4, wherein the first predetermined angle is 90° and the second predetermined angle is 90°.

\* \* \* \* \*